(No Model.)

E. BOECKMANN.
STERILIZER FOR SURGICAL DRESSINGS.

No. 510,321. Patented Dec. 5, 1893.

Witnesses.
F. Tillier.
P. G. Petterson.

Inventor
Edward Boeckmann
By G. J. Lomen
Attorney

UNITED STATES PATENT OFFICE.

EDUARD BOECKMANN, OF ST. PAUL, MINNESOTA.

STERILIZER FOR SURGICAL DRESSINGS.

SPECIFICATION forming part of Letters Patent No. 510,321, dated December 5, 1893.

Application filed July 5, 1893. Serial No. 479,558. (No model.)

*To all whom it may concern:*

Be it known that I, EDUARD BOECKMANN, a subject of the King of Sweden and Norway, who have declared my intention to become a citizen of the United States, residing at St. Paul, county of Ramsey, State of Minnesota, have invented a new and useful Sterilizer for Surgical Dressings, &c., of which the following is a specification.

My invention relates to improvements in sterilizers for surgical dressings, &c., in which steam and hot air are employed for the purpose of sterilization; and the objects of my invention are to combine in one apparatus or mechanism new and useful facilities for sterilizing surgical dressings, &c., by steam or hot air or both; for conducting saturated low steam of about 212° Fahrenheit through the sterilizing chamber from above for the purpose of effective sterilization, and for superheating it in its passage to the exterior, and thereby avoiding excessive vaporization in the sterilizing room; for introducing into the sterilizing chamber hot air at a temperature of 284° Fahrenheit for the purpose of hot air sterilization, especially of cat gut, which cannot properly be sterilized by steam, or for the purpose of rapid expulsion of steam from the sterilizing chamber after sterilization by steam.

My invention relates also to the manufacture of steam and hot air sterilizers and has for its object to simplify and cheapen their construction. I attain these objects by the mechanism illustrated in the accompanying drawings in which—

Figure 1:
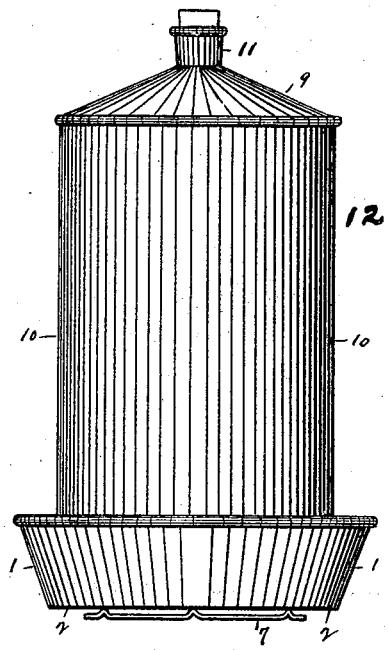
Figure 2:
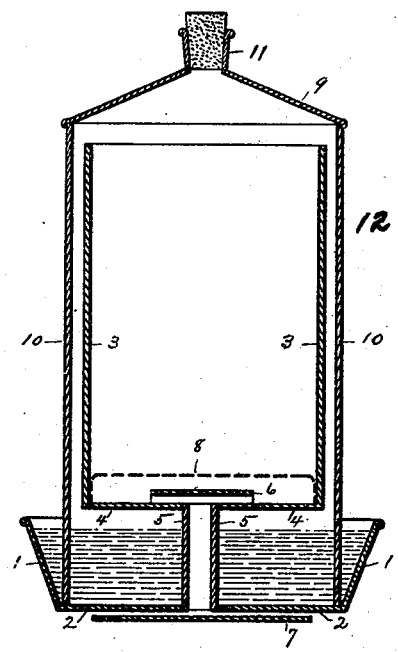
Figure 3:
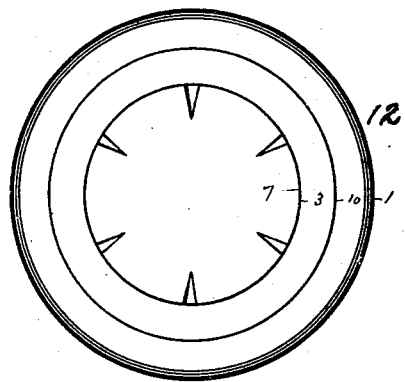
Figure 4:
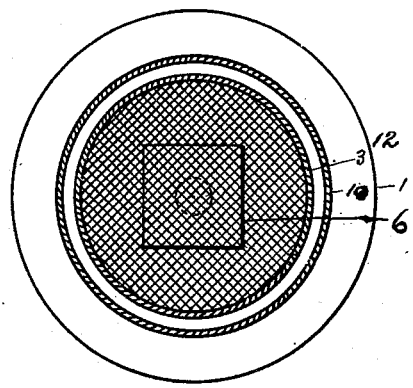

Figure 1 is a side elevation of the sterilizer. Fig. 2 is a central vertical section of the same. Fig. 3 is a view in detail showing the flame-spreader. Fig. 4 is a view in detail showing the heat-spreader.

In the said drawings, similar figures designate corresponding parts throughout the several views, referring to which—

1, indicates the water vessel which comprises the flat bottom 2, and side walls which are preferably inclined, as shown, and 3, indicates the cylindrical receptacle for the dressing to be sterilized, which receptacle preferably has a flat bottom 4.

Centrally between the bottoms 2, and 4, and supporting the receptacle above the vessel 1, a vertical tube 5, open at both ends, but sealed to the bottoms, which at this point are perforated, serves as a hot air conductor or steam escape as hereinafter shown. Within the receptacle 3 immediately above the upper end of tube 5 a square plate 6 having its corners bent downward to slightly elevate it above the bottom 4, on which it rests, operates as a heat-spreader and prevents excessive heat at the tube opening. Immediately below the lower end of tube 5 around corrugated plate 7 prevents the flame from entering the tube 5. It also superheats the steam as the latter escapes through the tube 5 and over said plate so as to prevent excessive vaporization in the room in which the sterilizer is operated. The flame-spreader or plate 7 is preferably attached to the bottom, but in such manner as to preserve communication between the receptacle 3 and the exterior.

Within the receptacle 3 and immediately above the heat-spreader I employ a wire screen or diaphragm 8, on which the dressings, &c., to be sterilized rest, and by means of which better, and more uniform circulation of steam or hot air through the receptacle is produced. Covering the vessel 1, and receptacle 3 is a casing 12 which preferably comprises a pitched cover 9, having a broad depending flange 10, adapted to surround the receptacle 3 and fit into the vessel 1, at the point of connection between its shell and bottom and forming between the flange and receptacle 3 a steam-space, and between the bottoms of the vessel and receptacle a steam and water space. Vertically through the center and top of the cover a tube 11, extending upward, communicates with the exterior, except when during sterilization it is stopped with a cork, which it is adapted to receive.

To use the sterilizer remove the cover. Fill the vessel 1 with water. Arrange within receptacle 3 the dressings, &c., to be sterilized. Replace the cover and place the apparatus over a flame. When the water comes to a boil, stop the tube in the cover with a cork. The steam generated in the vessel 1 will then rise and pass through the receptacle 3 from above, sterilizing the receptacle and contents, and escape through the tube connecting and extending through the bottoms of the receptacle and boiler, and in its passage thence over the flame-spreader is superheated and devaporized. For expelling the steam from the receptacle or for dry sterilization, remove the cork. After complete sterilization, which will require about thirty minutes, remove the sterilizer from the fire.

I am aware that prior to my invention both steam and hot air sterilizers have been made. I do not therefore claim, broadly, as my invention the use of steam or hot air for such purpose.

What I do claim as my invention, and desire to secure by Letters Patent, is—

1. The herein described sterilizing apparatus, comprising the water vessel, the cylindrical receptacle for the material to be treated arranged above the water vessel and having its upper end open, the vertically-disposed tube 5, communicating with the interior of the cylindrical receptacle and extending downwardly through the bottom of the water vessel, and communicating at its lower end with the open air, and the closed casing surrounding the cylindrical receptacle and forming a steam space or passage communicating with the interior of the water vessel and with the interior of the cylindrical receptacle at the upper end of said receptacle, substantially as and for the purpose set forth.

2. The sterilizing apparatus herein described, comprising the water vessel, the cylindrical receptacle for the material to be treated, arranged above the water vessel and having its upper end open, the vertically-disposed tube 5, communicating with the interior of the cylindrical receptacle and extending downwardly through the bottom of the water vessel, the closed casing surrounding the cylindrical receptacle and forming a steam space or passage communicating with the interior of the water vessel and with the interior of the cylindrical receptacle, a horizontal deflector plate supported in the cylindrical receptacle above the upper end of the tube 5, and the flame spreading plate 7, arranged beneath the bottom of the water vessel, all substantially as specified.

In witness whereof I have hereto affixed my signature in the presence of two witnesses.

EDUARD BOECKMANN.

Witnesses:
F. TILLIER,
P. G. PETTERSEN.